Figure 9:
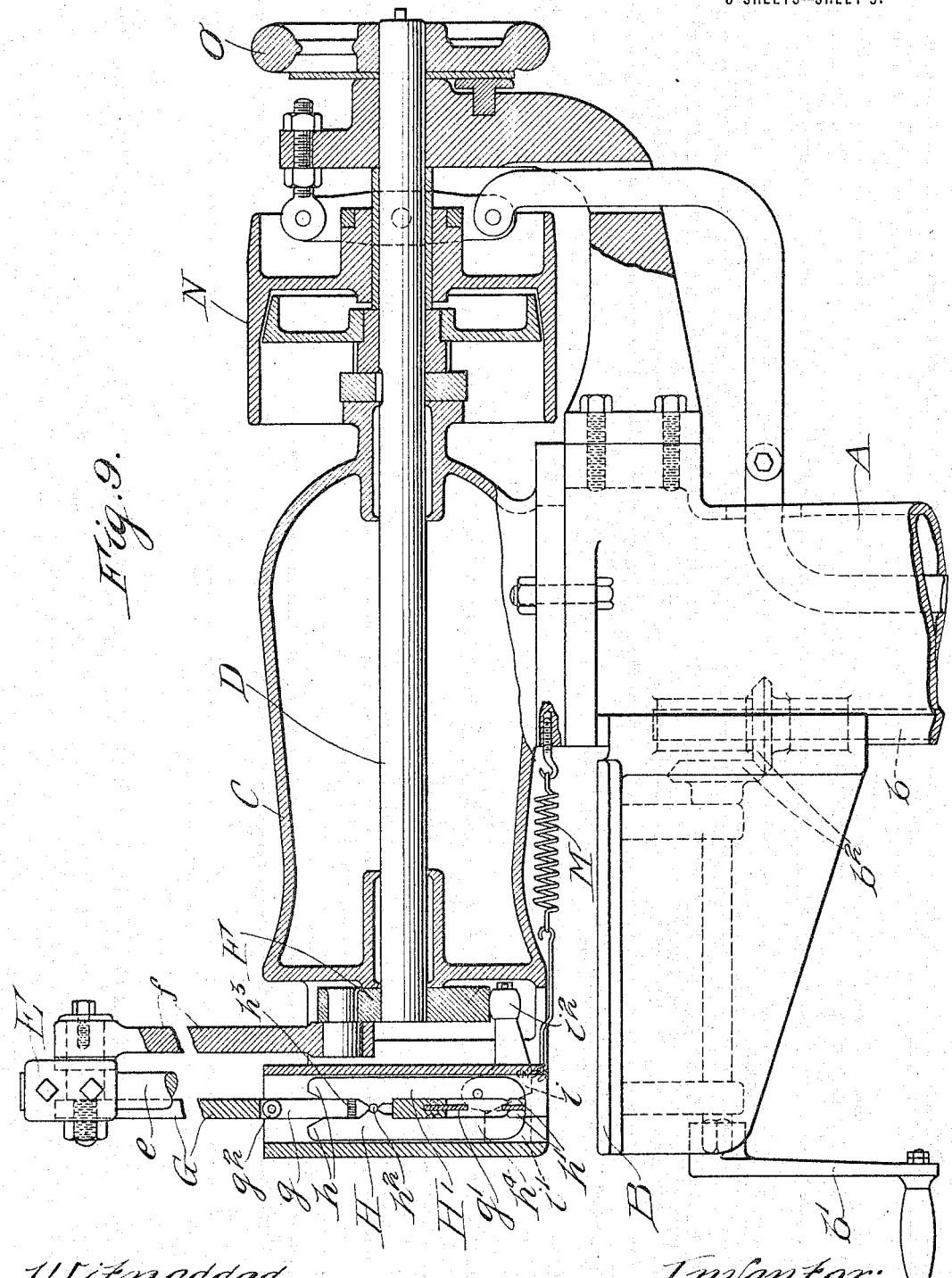

W. H. RAY.
SHEET METAL FASTENER DRIVING MACHINE.
APPLICATION FILED MAR. 7, 1906.
1,152,840.
Patented Sept. 7, 1915.
8 SHEETS—SHEET 1.
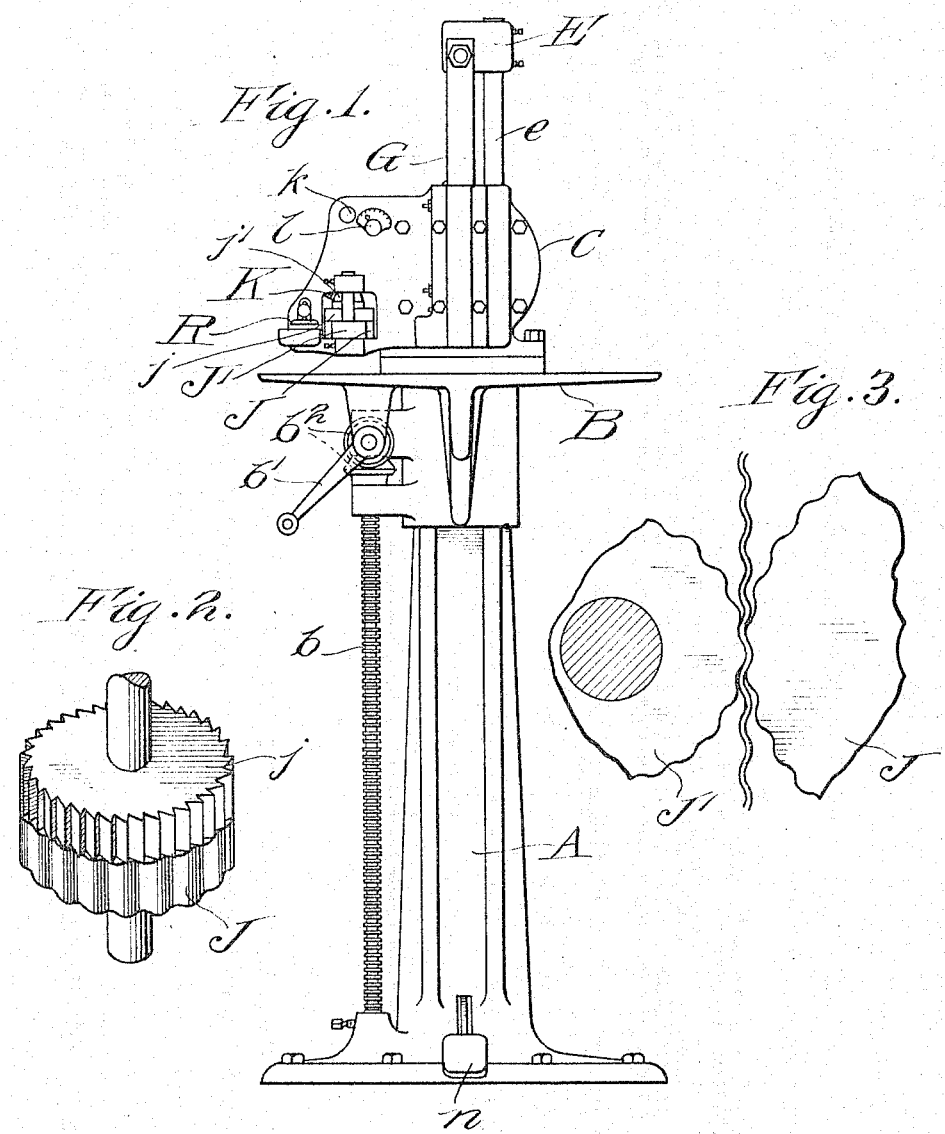

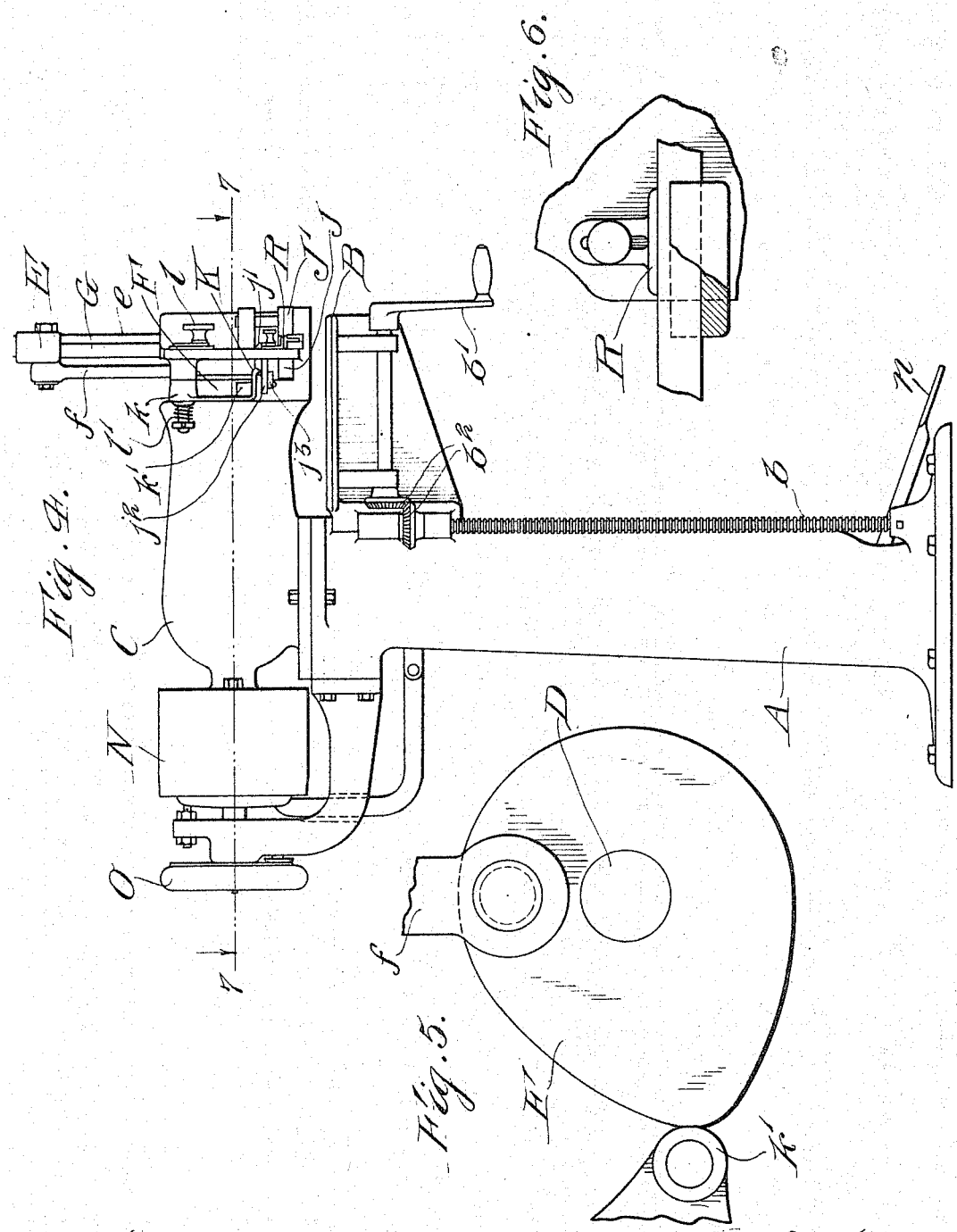

W. H. RAY.
SHEET METAL FASTENER DRIVING MACHINE.
APPLICATION FILED MAR. 7, 1906.
1,152,840.
Patented Sept. 7, 1915.
8 SHEETS—SHEET 3.
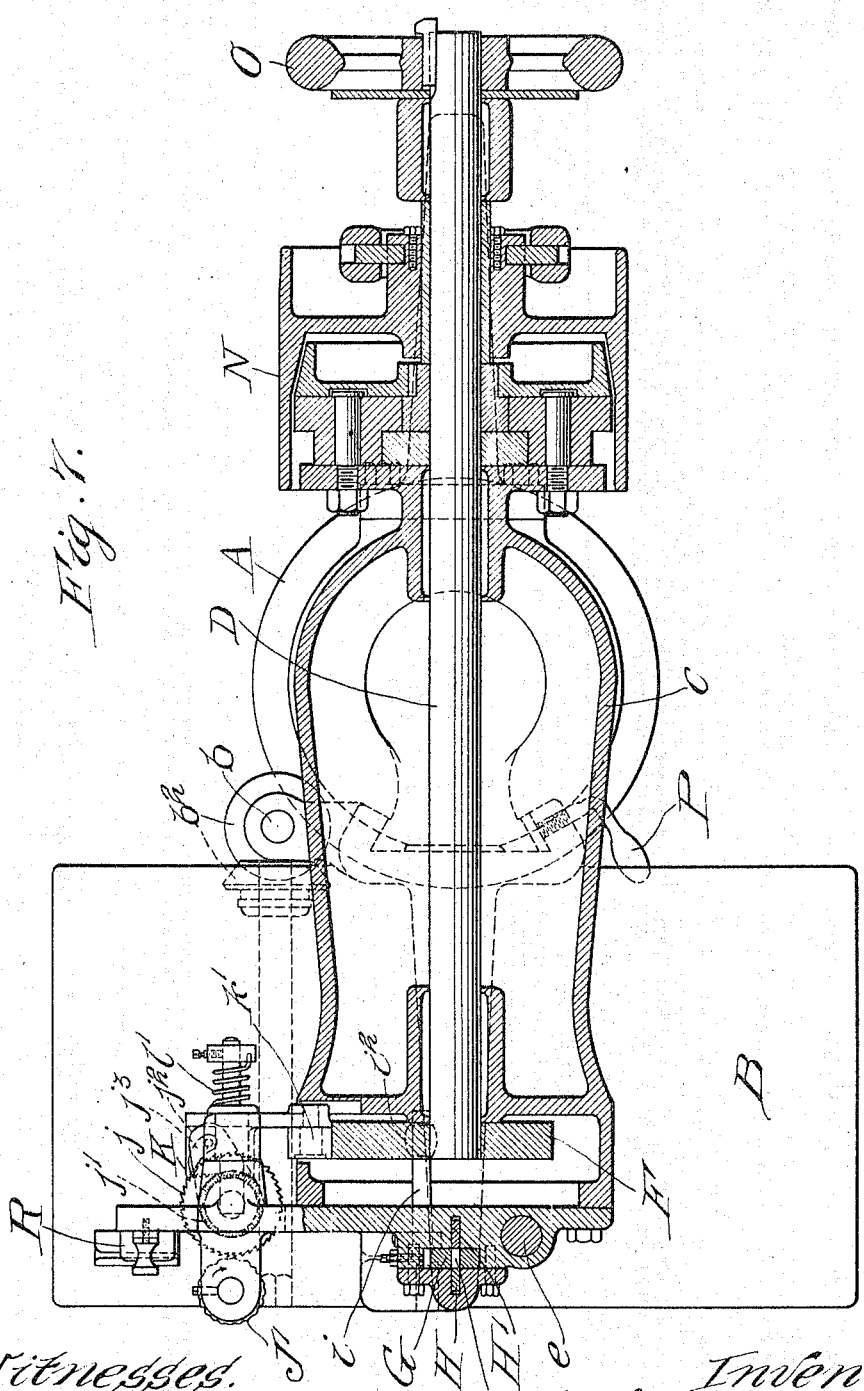

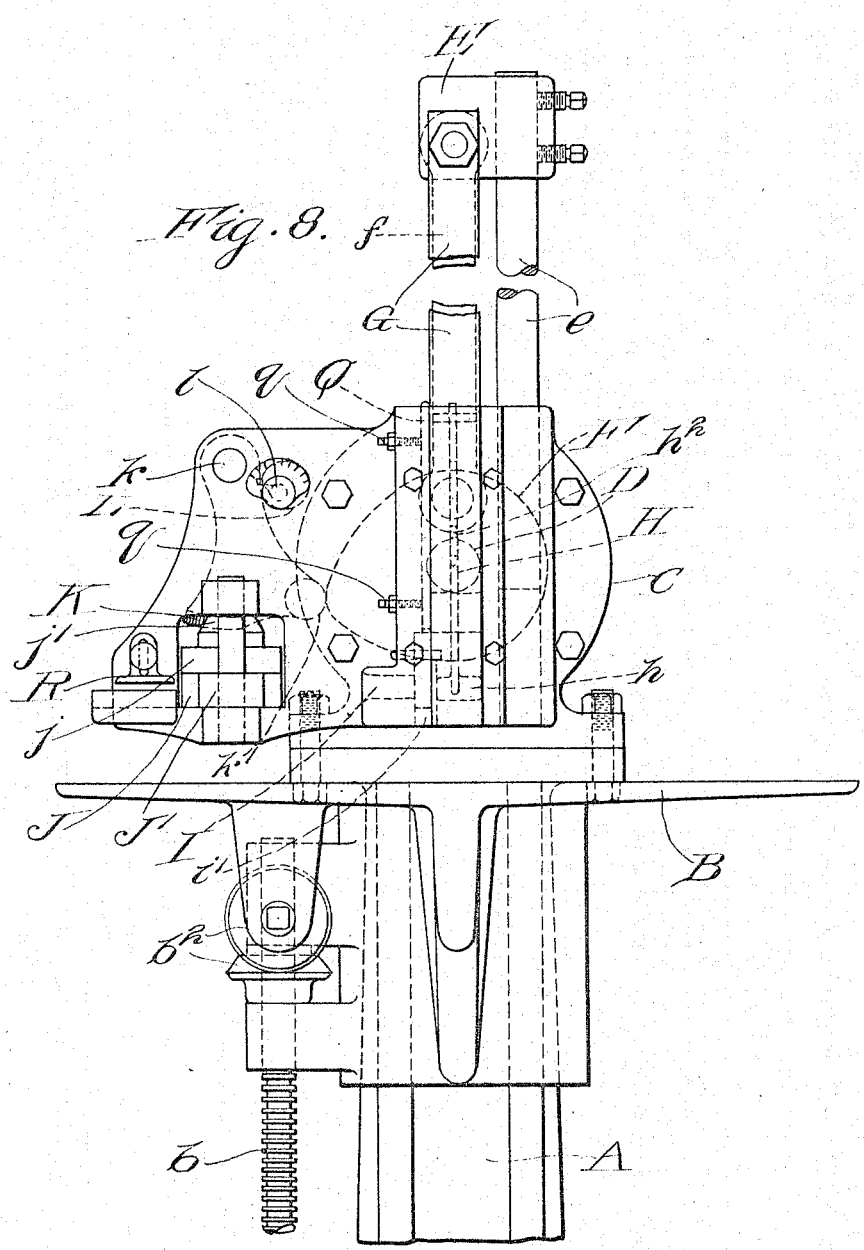

W. H. RAY.
SHEET METAL FASTENER DRIVING MACHINE.
APPLICATION FILED MAR. 7, 1906.

1,152,840.

Patented Sept. 7, 1915.
8 SHEETS—SHEET 5.

Witnesses.
R. H. Binfried
Albert John Sauser

Inventor:
William H. Ray
By Bulkley & Durand
Attorneys.

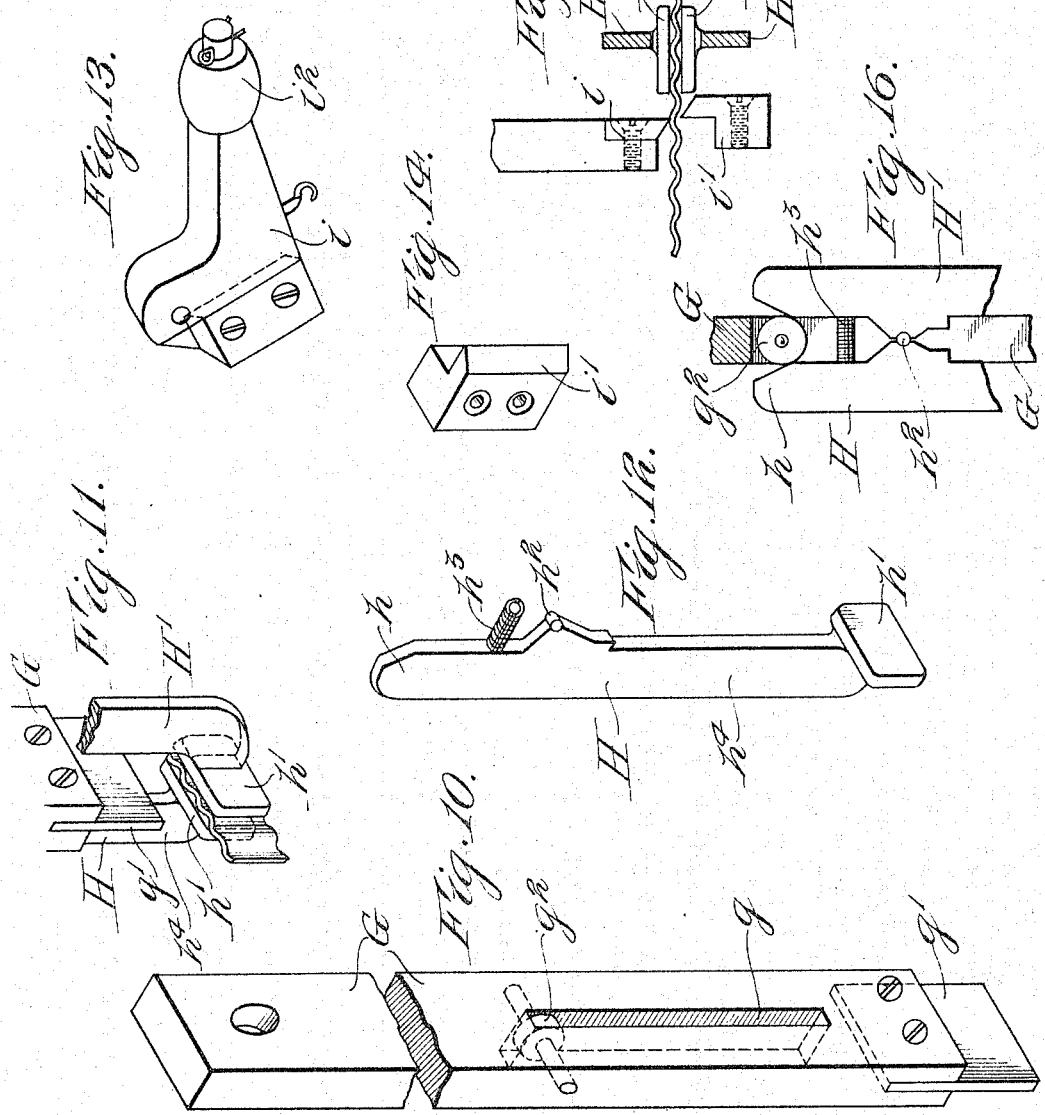

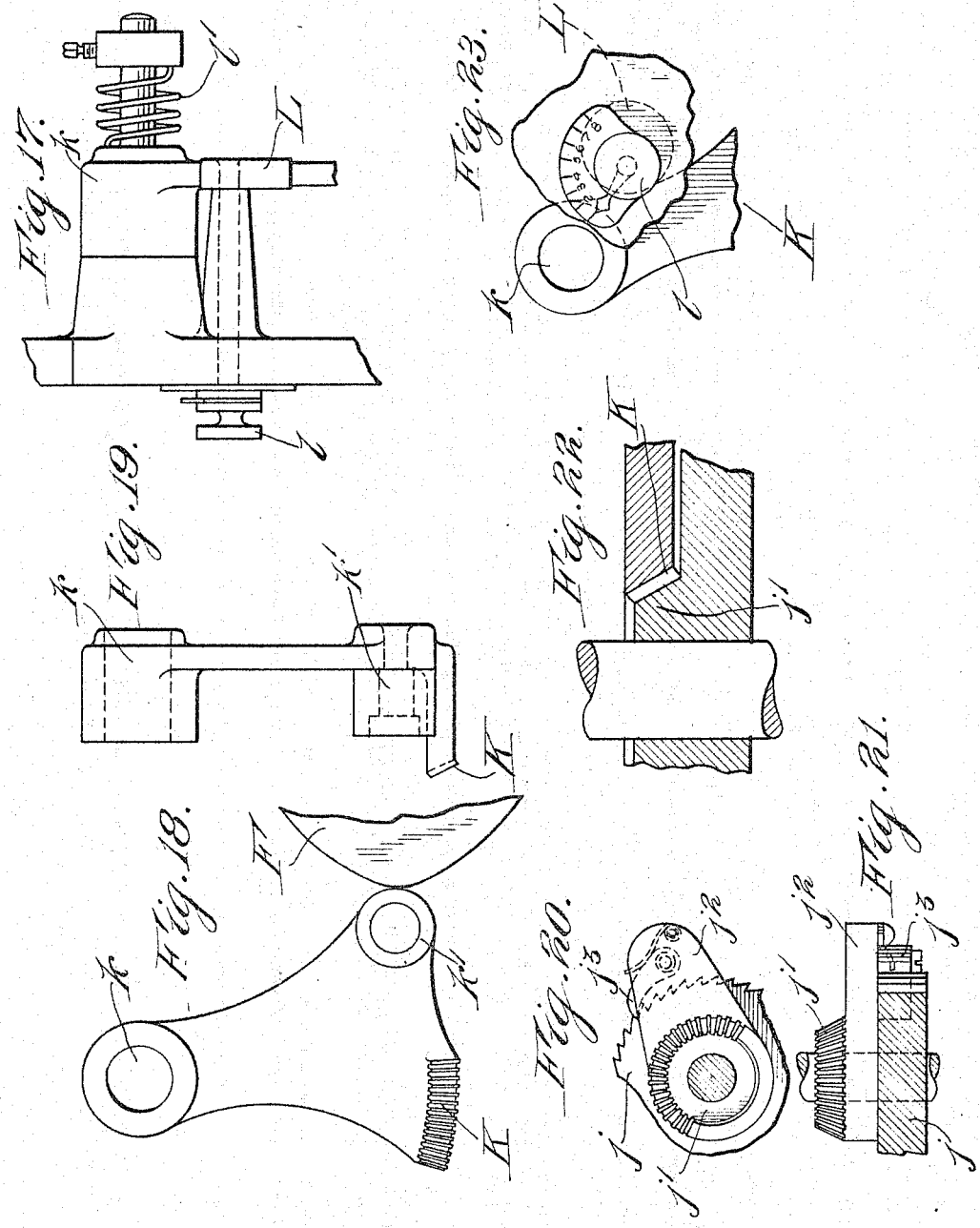

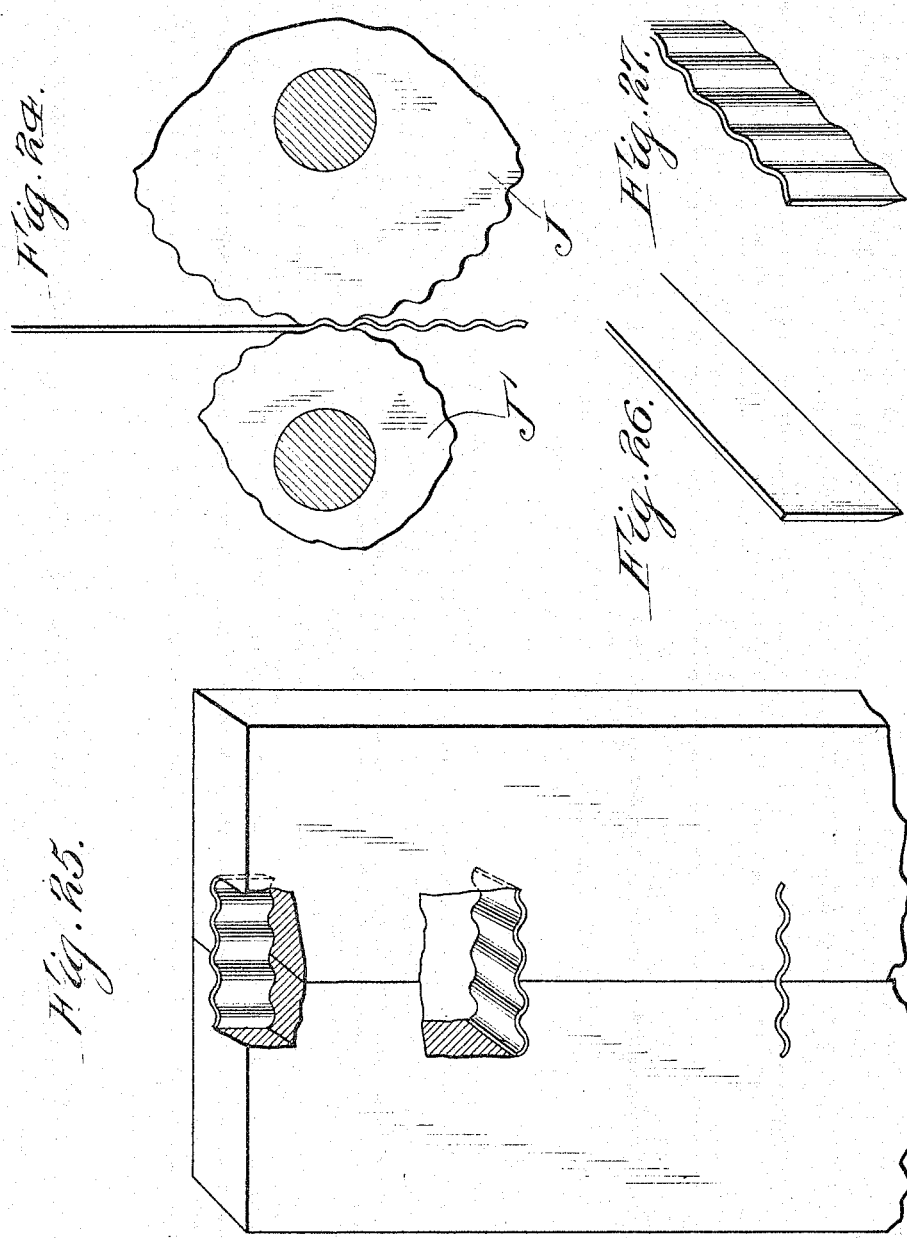

UNITED STATES PATENT OFFICE.

WILLIAM H. RAY, OF ST. JOSEPH, MICHIGAN, ASSIGNOR, BY MESNE ASSIGNMENTS, TO SARANAC MACHINE CO., OF ST. JOSEPH, MICHIGAN, A CORPORATION OF MICHIGAN.

SHEET-METAL-FASTENER-DRIVING MACHINE.

1,152,840.  Specification of Letters Patent.  Patented Sept. 7, 1915.

Application filed March 7, 1906. Serial No. 304,787.

*To all whom it may concern:*

Be it known that I, WILLIAM H. RAY, a citizen of the United States of America, and resident of St. Joseph, Michigan, have invented a certain new and useful Improvement in Sheet-Metal-Fastener-Driving Machines, of which the following is a specification.

My invention contemplates a machine capable of making and driving crimped or corrugated sheet metal fasteners.

For the broader purposes of my invention such a machine may or may not contain the means for doing the crimping or corrugating; and, on the other hand, if it contains the crimping or corrugating mechanism, then, and for the broader purposes of my invention it may or may not contain the mechanism for cutting off the fasteners. In other words, the combination of corrugating and driving means is new with me. Preferably, however, the machine includes means for corrugating and feeding a strip of sheet metal, for then cutting off a length of such transversely corrugated sheet metal, and for then driving the finished fastener into the wood or other material in a direction to invert the corrugations endwise.

To the foregoing and other useful ends my invention consists in matters hereinafter set forth and claimed.

In the accompanying drawings—Figure 1 is a front elevation of a machine embodying the principles of my invention; Fig. 2 shows one of the feed rolls; Fig. 3 shows the application of the feed rolls to the feeding of an already or previously crimped strip of sheet metal; Fig. 4 is a side elevation of said machine; Fig. 5 shows the cam for operating the feeding and cutting devices; Fig. 6 shows the device for guiding the sheet metal strip to the feed rolls; Fig. 7 is an enlarged horizontal section on line 7—7 in Fig. 4; Fig. 8 is an enlarged front elevation of the upper portion of said machine, showing certain parts in dotted lines; Fig. 9 is an enlarged vertical longitudinal section of the upper portion of said machine; Fig. 10 is an enlarged perspective of the fastener driver; Fig. 11 illustrates the driving of one of the fasteners; Fig. 12 is a perspective of one of the guide fingers; Fig. 13 is a perspective view showing the movable knife; Fig. 14 shows the stationary knife; Fig. 15 is a detail view looking down on the two knives and the lower portions of the fingers; Fig. 16 is a detail view showing the manner in which the driver crowds the two fingers apart; Fig. 17 is a detail view looking down on the device for varying the feed; Fig. 18 shows the swinging rack for actuating the feed rolls; Fig. 19 is an edge view of the swinging rack shown in Fig. 18; Figs. 20 and 21 show the ratchet feed device; Fig. 22 shows the manner in which the swinging rack engages the beveled pinion on the ratchet wheel; Fig. 23 shows the device for gaging the extent of feed; Fig. 24 shows the use of the feed rolls for both crimping and feeding the sheet metal strips from which the crimped fasteners are made; Fig. 25 shows the use of the fasteners for securing strips of wood together; Fig. 26 shows a flat or straight strip of sheet metal; Fig. 27 shows a crimped strip of sheet metal.

As thus illustrated, the base or standard A is adapted to support the crimping or corrugating and driving and other operative parts in suitably elevated positions. The table B is adjustably mounted upon the upper end of said base or standard and adapted to be moved up and down by means of the vertical adjusting screw $b$ and the crank $b'$ and bevel gearing $b^2$. A hollow body C contains an operating shaft D and is fixed to the upper end of the base or standard A. The head E is mounted on the upper end of the rod $e$ which slides up and down in a bearing on the body. A combined crank plate and cam F is mounted on the said shaft and inclosed in the body just back of the driver G, which latter has its upper end secured to the head E. The said cam and crank plate is connected with the head E by a pitman $f$. Said fastener driver G has a longitudinal slot $g$ and a relatively thin lower portion $g'$, and a roll $g^2$ at the upper end of said slot. As shown, the driver slides up and down in a guideway provided in the body. At each side of the driver are the fingers H—H' which hold the fasteners while the same is being driven by the end portion $g'$ of the driver. These fingers work or operate by having their upper ends $h$ engaged by the roll $g^2$ and held apart to cause their lower ends $h'$ to firmly grip the corrugated sides of the fastener. The two fingers rock or swing slightly upon the pin $h^2$ interposed between them in the slot in the driver. A spring $h^3$, interposed between the upper ends of the fingers, causes the portions $h^4$ to grip the driver, so that the finger and driver will move down together. The guide-way I (see Fig. 8) allows the crimped or corrugated strip of sheet metal to enter horizontally between the opposing lower ends of the fingers. The pivoted knife $i$, and the fixed knife $i'$ are mounted at opposite sides of the mouth of said guide-way (see Fig. 15). Said pivoted knife carries a roll $i^2$ which engages the lower edge of the cam F. The two shearing knives thus provided have cutting edges which are as long or longer than the corrugations, so as to make a clean cut. The two fluted corrugating and feed rolls J and J' are mounted in line with the guide-way I. Preferably, the larger roll J is positively actuated, while the smaller roll J' is merely a coöperating idle roll. A ratchet wheel $j$ is fixed to the larger roll. Both rolls are mounted on the body and arranged to rotate about vertical axes. The axis of the larger roll carries loosely a bevel pinion $j'$ provided with an arm $j^2$ carrying a ratchet pawl $j^3$. A bevel rack K is pivoted on the body at $k$ and provided with a roll $k'$. The teeth of said rack engage the said bevel pinion $j'$. As shown, the roll $k'$ engages the cam F. A cam L acts as a stop to limit the back stroke of the said swinging rack. A handle $l$ is secured to the outer end of the stem of said cam and used for rotating the latter to vary the back stroke of the rack, and to thus vary the feed. In this way, the length of the fasteners and the number of corrugations for each fastener can be varied at will. A spring $l'$ produces the back stroke of the swinging rack K. The spring M keeps the pivoted knife in engagement with the cam. A friction pulley clutch N is employed to rotate and start and stop the operation of the shaft D. Said clutch is controlled by a foot lever $n$. Preferably a hand wheel O is secured to the rear end of the shaft D. The lower bevel gear $b^2$ can be threaded and adapted to act as a nut for raising and lowering the table D on the screw $b$. The table can be secured in any position by the set screw P. A gib Q and some set screws $q$ can be employed for taking up wear in the guide-way in which the driver and fingers slide up and down. Preferably, a guiding device R is employed for guiding the sheet metal strip to the feed rolls. Thus it will be seen that the machine will work with either straight or crimped or corrugated stock, that is to say, the long strip of metal can be either straight or crimped, as the feed rolls will handle either kind. If the stock is already crimped or corrugated, then the feed rolls merely serve as a feeding means; but if straight metal is used, the rolls then serve as a combined crimping or corrugating and feeding means.

The operation is as follows: The metal has been fed below the driver and between the fingers (see the drawings) as this was accomplished by the last quarter rotation of the shaft. As the cam and crank starts to rotate the knives will cut off the length of metal. This will also cause the driver to move downward. The fingers will also move down and carry the fastener with them. The driver and fingers move until the fingers strike the work, and after that the movement is confined to the driver. In this way the fastener is driven edgewise into the wood or other material in a direction to insert the corrugations endwise. The roller on the driver causes the lower end of the fingers to clamp and hold the fastener in a vertical position. Said driver now returns to the normal position carrying the fingers with it. The fingers only move up a certain distance, a stop of any suitable character being provided, but the driver moves up as far as the head carries it. In this way the fingers stop at the right point, so as to receive the fasteners, and then the driver moves upward alone, the fingers standing still. On the last quarter turn of the shaft the cam causes the ratchet feed to move the transversely corrugated metal strip along. This brings the end of the strip between the fingers and into position for cutting off. The next fastener is driven when the head moves down again.

A suitable friction brake can be applied to the hand wheel on the shaft to stop the movement when the head reaches the limit of its up stroke.

A machine of this character can be employed for making box blanks and other articles. If modified to dispense with the cutting operation, then suitable corrugating means must be employed; and if the corrugating operation be dispensed with, then the cutting mechanism is necessary; but in either case, as well as with the arrangement set forth and illustrated, the machine is one for making and driving corrugated sheet metal fasteners.

What I claim as my invention is:—

1. In a machine for making and driving corrugated sheet metal fasteners, the combination of means for first forming transverse corrugations in the strip of sheet metal, means for then cutting off a suitable length of said strip of corrugated sheet metal, means for finally driving the sheet metal edgewise and in a direction to insert the corrugations endwise, and suitable operating connections by which the corrugating and cutting and driving operations are performed on each fastener in the order mentioned, said cutting means including a pair of shearing knives, one knife being pivoted, the cutting edges of which knives are longer than the transverse corrugations in the strip of sheet metal, the said driving means including a fastener driver provided with an end portion adapted to engage the ends of the transverse corrugations of each fastener.

2. In a machine for making and driving corrugated sheet metal fasteners, the combination of automatic means for feeding a transversely corrugated strip of sheet metal, automatic means for cutting off a suitable length of the strip of sheet metal thus fed in a direction cross-wise of its transverse corrugations, means for driving the sheet metal fasteners edgewise and in a direction to insert the corrugations endwise, and suitable connections by which the feeding and cutting and driving operations are performed on each transversely corrugated fastener in the order mentioned, said cutting means including a pair of shearing knives, one knife being pivoted, the cutting edges of which are longer than the transverse corrugations in the strip of sheet metal, the said driving means including a fastener driver provided with an end portion adapted to engage the ends of the transverse corrugations of each fastener.

3. In a machine for making and driving corrugated sheet metal fasteners, the combination of means for first forming transverse corrugations in the strip of sheet metal, means for then cutting off a suitable length of said strip of corrugated sheet metal, means for finally driving the sheet metal edgewise and in a direction to insert the corrugations endwise, suitable operating connections by which the corrugating and cutting and driving operations are performed on each fastener in the order mentioned, and holding means adapted to move with each finished fastener to engage and support the corrugated sides thereof.

4. A machine for making and driving corrugated sheet metal fasteners, by inserting the fasteners edgewise in the line of their corrugations, comprising mechanism for driving the fasteners, automatic mechanism in said machine for feeding a transversely corrugated strip of sheet metal to said driving mechanism, and means for cutting off suitable lengths of the corrugated strip of metal and delivering the same to said driving mechanism, said cutting means including a pivoted knife.

5. In a machine for making and driving corrugated sheet metal fasteners, the combination of automatic means for first forming transverse corrugations in the strip of sheet metal, automatic means for then cutting off a suitable length of said strip of corrugated sheet metal, automatic means for finally driving the sheet metal edgewise and in a direction to insert the corrugations endwise, and suitable operating connections by which the corrugating and cutting and driving operations are performed on each fastener in the order mentioned, including a single shaft the end of which is operatively connected by a fixed element thereon with all said means, and mechanism for controlling the rotation of said shaft.

6. In a machine for making and driving corrugated sheet metal fasteners, the combination of automatic means for feeding a transversely corrugated strip of sheet metal, automatic means for cutting off a suitable length of the strip of sheet metal thus fed in a direction crosswise of its transverse corrugations, means for driving the sheet metal fasteners edgewise and in a direction to insert the corrugations endwise, and suitable connections by which the feeding and cutting and driving operations are performed on each transversely corrugated fastener in the order mentioned, including a single shaft the end of which is operatively connected by a fixed element thereon with all said means, and mechanism for controlling the rotation of said shaft.

7. In a machine for making and driving corrugated sheet metal fasteners, the combination of automatic means for feeding a transversely corrugated strip of sheet metal, automatic means for cutting off a suitable length of the strip of sheet metal thus fed, means for driving the sheet metal fastener edgewise and in a direction to insert the corrugations endwise, suitable connections by which the feeding and cutting and driving operations are performed on each transversely corrugated fastener in the order mentioned, and holding means comprising a pair of pivotal engaging fingers arranged to move with each finished fastener to engage and support the corrugated sides thereof, said driving means having an element which passes between said fingers.

8. In a machine of the class specified, the combination of automatic means for forming transverse corrugations in a rectangular sheet metal fastener, suitable means for receiving and holding the finished fastener in position for edgewise insertion, including a pair of pivotally acting fingers which are disposed in position and arranged to receive one fastener while another fastener is being corrugated, and driving mechanism for engaging the ends of the corrugations to insert the same endwise, said driving means being slotted to accommodate the pivot of said fingers and having an element which passes between said fingers.

9. In a machine of the class specified, the combination of a combined corrugating and feeding mechanism adapted to form transverse corrugations in a strip of sheet metal and feed the same forward in the direction of its length, a cutting mechanism having a shearing gradual action for cutting off lengths of said transversely corrugated strip of sheet metal; a cam for successively operating said feeding and cutting mechanism, a driving mechanism for engaging the ends of the said corrugations to insert each finished fastener edgewise, and means for guiding the said transversely corrugated strip of sheet metal to the said cutting and driving means.

10. In a machine for making and driving corrugated sheet metal fasteners, the combination of means for first forming transverse corrugations in the strip of sheet metal, means having a shearing action for then cutting off a suitable length of said strip of corrugated sheet metal, means for finally driving the sheet metal edgewise and in a direction to insert the corrugations endwise, a crank for operating said driving mechanism, suitable operating connections by which the corrugating and cutting and driving operations are performed on each fastener in the order mentioned, and means for varying at will the length of the fastener and therefor the number of corrugations for each fastener.

11. In a machine for making and driving corrugated sheet metal fasteners, the combination of automatic means for feeding a transversely corrugated strip of sheet metal, automatic means having an oscillatory motion for cutting off a suitable length of the strip of sheet metal thus fed in a direction crosswise of its transverse corrugations, means for driving the sheet metal fasteners edgewise and in a direction to insert the corrugations endwise, a crank for operating said driving mechanism, suitable connections including said crank by which said feeding and cutting and driving operations are performed on each transversely corrugated fastener in the order mentioned, and means for varying at will the number of corrugations for each fastener.

12. In a machine of the class specified, the combination of a combined corrugating and feeding mechanism adapted to form transverse corrugations in a strip of sheet metal and feed the same forward in the direction of its length, a cutting mechanism having an oscillatory motion for cutting off lengths of said transversely corrugated strip of sheet metal, a driving mechanism for engaging the ends of the said corrugations to insert each finished fastener edgewise, a shaft for operating said driving means, and for operating said feeding and cutting mechanism, means for guiding the said transversely corrugated strip of sheet metal to the said cutting and driving means, and means for varying at will the number of corrugations for each fastener.

13. The combination with devices for deflecting and thus corrugating a strip of sheet metal, of devices for cutting said strip into suitable lengths and thereby forming fastening plates, devices for driving the severed strips or fasteners successively and edgewise in the line of the corrugations into wood, and a single combined crank plate and cam for operating all said devices, said cutting and feeding devices having engagement with the periphery of said cam.

14. The combination with devices for corrugating a strip of metal, and means for actuating said devices whereby the strip is simultaneously corrugated and fed, of devices for cutting said strip into suitable lengths and thereby forming fastening plates, devices for driving the severed strips or fasteners successively and edgewise in the line of the corrugations into wood, and a single crank plate and cam for operating all said devices, said cutting devices having engagement with said cam.

15. The combination with devices for corrugating a strip of metal and means for actuating said devices whereby the strip is simultaneously corrugated and fed, of devices for cutting such strip into suitable lengths and thereby forming fastening plates, devices for regulating the length of the cut up strips, other devices for driving the severed strips or fasteners successively and edgewise in the line of the corrugations into wood, and automatically operated fingers for holding the fasteners in position, the driving devices having a slotted device arranged to pass between said fingers, and said fingers having supporting portions extending into said slot.

16. The combination with a supporting body of metal and associated supporting parts, of a pair of corrugating rollers for corrugating a strip of metal, a cutter device and cutter bed for severing the corrugated strip into suitable lengths and thereby forming fastening plates, devices for feeding the strip, a hammer device for driving the said severed strips or fasteners successively and edgewise in the line of the corrugations into wood, and automatically operated fingers for holding the fasteners in position, the driving device being slotted and arranged to pass between said fingers, and said fingers having supporting portions extending into said slot.

17. A machine having suitable combined devices for corrugating, cutting up and driving strips of metal into wood, the corrugating devices comprising corrugating rollers, their shafts and bearings, a ratchet mounted upon the shaft of one of said rollers, a pawl for engaging and moving the said ratchet, devices mounted upon the same shaft as the ratchet and having a pivotal relation thereon, one of which devices carries the said pawl and a device co-acting with the aforesaid devices and having an adjustable relation thereto whereby the extent of movement imparted to the pawl may be varied at the will of the operator, and a device for actuating said adjustable parts and the pawl, including a pivoted rack and pinion.

18. A machine for making corrugated sheet metal fasteners, and for inserting the fasteners edgewise in the line of their corrugations, comprising mechanism for driving the said fasteners, and automatic mechanism in said machine for forming a plurality of transverse corrugations on each fastener before it is driven, together with a pivoted rack and pinion for operating said forming mechanism.

19. In a machine of the character described, means for feeding a metal strip, means for varying said feed, to produce fasteners of different widths, means for severing a fastener from said strip, means for driving the fastener edgewise, and a combined crank plate and cam for operating all said means, said cam having peripheral engagement with an element of the severing means.

20. In a machine of the character described, the combination with a support for the material to be joined, of means for feeding a metal strip, means for varying said feed, to produce fasteners of different widths, means for severing the end of said strip, means for holding said severed end, means for forcing said severed end edgewise from said holding means and into the material aforesaid, and a rotary member which operates said severing and forcing means, having a peripheral engagement with said severing means.

21. In a machine of the character described, the combination with a support for the material to be joined, of means for imparting a step-by-step movement to a metal strip, means for holding said severed ends, means for forcing said severed ends edgewise from said holding means and into the material aforesaid, and a rotary member which operates said severing and forcing means, having a peripheral cam engagement with said severing means.

22. In a machine of the character described, the combination with a support for the material to be joined, of means for receiving one end of a metal strip, means for feeding said strip with a step-by-step movement, means for varying the extent of said movement, to produce fasteners of different widths, means for severing the successive ends of said metal strip, means for holding said severed ends, means for forcing said severed ends edgewise from said holding means into the material aforesaid, and a rotary member which operates said severing and forcing means, having a peripheral cam engagement with said severing means.

23. In a machine of the character described, the combination with a support for the material to be joined, of means for receiving one end of a metal strip, means for feeding said strip with a step-by-step movement, means for varying the extent of said movement, to produce fasteners of different widths, a cutting device for severing the end of said strip as it is advanced, means for holding said severed end, means for forcing said severed end edgewise from said holding means, into the material aforesaid, and a rotary member which operates said severing and forcing means, having a peripheral cam engagement with said severing means.

24. In a machine of the character described, the combination with a support for the material to be joined of a transverse support arranged above said support having arranged thereon a feeding device adapted to advance one end of a metal strip, means for varying the amount of said strip advanced, a chuck arranged adjacent to said feeding device adapted to receive the end of said strip, a cutting device adapted to sever the end of said strip within said chuck, spring-actuated means for holding the severed end of said metal strip longitudinally in a horizontal position within said chuck, means for forcing said severed end edgewise from said chuck into the material to be joined, and a rotary member which operates said severing and forcing means, having a peripheral cam engagement with said severing means.

25. In a machine of the character described, the combination with a support for the material to be joined, of a transverse member arranged above said support, having arranged thereon a feeding device adapted to advance a metal strip, means for adjusting said feeding device to vary the extent of the feed, a chuck arranged adjacent to said feeding device to receive one end of said strip, a cutting device arranged to sever the end portion of said strip, operated by rotary motion, means for holding the severed end of said strip longitudinally in a horizontal position within said chuck, means for forcing said severed end edgewise from said chuck into the material to be joined, and a combined crank plate and cam for operating said cutting device and forcing means, said cutting and feeding devices having means for engaging the periphery of said cam.

Signed by me at St. Joseph, Michigan, this 28th day of February, 1906.

WILLIAM H. RAY.

Witnesses:
 EDWARD S. KELLEY,
 LOUISE KELLEY.